United States Patent
Adachi et al.

(10) Patent No.: US 10,578,455 B2
(45) Date of Patent: Mar. 3, 2020

(54) DEVICE FOR PROVIDING ELECTRIC-MOVING-BODY INFORMATION AND METHOD FOR PROVIDING ELECTRIC-MOVING-BODY INFORMATION

(71) Applicant: MITSUBISHI HEAVY INDUSTRIES, LTD., Tokyo (JP)

(72) Inventors: Tetsuya Adachi, Tokyo (JP); Shinya Ishii, Tokyo (JP); Nobuyuki Owari, Tokyo (JP); Hidekazu Ono, Tokyo (JP); Hiroyuki Kozawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 105 days.

(21) Appl. No.: 15/115,809

(22) PCT Filed: Mar. 6, 2014

(86) PCT No.: PCT/JP2014/055786
§ 371 (c)(1),
(2) Date: Aug. 1, 2016

(87) PCT Pub. No.: WO2015/132931
PCT Pub. Date: Sep. 11, 2015

(65) Prior Publication Data
US 2017/0010125 A1   Jan. 12, 2017

(51) Int. Cl.
*G01C 21/36* (2006.01)
*B60L 15/20* (2006.01)
(Continued)

(52) U.S. Cl.
CPC ...... *G01C 21/3697* (2013.01); *B60L 15/2045* (2013.01); *B60L 53/14* (2019.02);
(Continued)

(58) Field of Classification Search
CPC ............ B60L 2260/52; B60L 2260/54; G01C 21/367; G01C 21/3697; Y02T 10/645;
(Continued)

(56) References Cited

U.S. PATENT DOCUMENTS

2010/0094496 A1   4/2010   Hershkovitz et al.
2013/0282265 A1   10/2013  Arita et al.
2014/0052373 A1   2/2014   Hoch et al.

FOREIGN PATENT DOCUMENTS

CN   102164773 A   8/2011
CN   103308049 A   9/2013
(Continued)

OTHER PUBLICATIONS

PCT/ISA/210, "International Search Report for International Application No. PCT/JP2014/055786," dated Jun. 10, 2014.
(Continued)

*Primary Examiner* — Charles J Han
(74) *Attorney, Agent, or Firm* — Hauptman Ham, LLP

(57) ABSTRACT

A device for providing electric-moving-body information is provided with a calculation unit for calculating, upon receiving a departure point and state of charge (SOC) of an electric vehicle, a plurality of reachable points capable of being reached if an electric vehicle departs from a destination after reaching the destination from the departure point and a display data generation unit for generating display data for displaying a reachable range display screen that makes it possible to visually recognize the plurality of reachable points. Information that is more useful for determining actions that can be taken after arriving at a destination is provided to an electric-moving-body user.

17 Claims, 12 Drawing Sheets

(51) Int. Cl.
*B60L 58/12* (2019.01)
*B60L 53/14* (2019.01)
*B60L 53/65* (2019.01)

(52) U.S. Cl.
CPC ............... *B60L 53/65* (2019.02); *B60L 58/12* (2019.02); *G01C 21/367* (2013.01); *B60L 2200/12* (2013.01); *B60L 2240/72* (2013.01); *B60L 2250/16* (2013.01); *B60L 2260/52* (2013.01); *B60L 2260/54* (2013.01); *Y02T 10/645* (2013.01); *Y02T 10/7005* (2013.01); *Y02T 10/705* (2013.01); *Y02T 10/7044* (2013.01); *Y02T 10/7072* (2013.01); *Y02T 10/72* (2013.01); *Y02T 10/7283* (2013.01); *Y02T 10/7291* (2013.01); *Y02T 90/121* (2013.01); *Y02T 90/128* (2013.01); *Y02T 90/14* (2013.01); *Y02T 90/161* (2013.01); *Y02T 90/163* (2013.01); *Y02T 90/169* (2013.01); *Y04S 30/14* (2013.01)

(58) Field of Classification Search
CPC ............... Y02T 10/7005; Y02T 10/705; Y02T 10/7283; Y02T 10/7291; Y02T 90/161; Y02T 90/163; Y02T 90/169
See application file for complete search history.

(56) References Cited

FOREIGN PATENT DOCUMENTS

| | | |
|---|---|---|
| CN | 103608643 A | 2/2014 |
| EP | 1275936 A2 | 1/2003 |
| JP | H07-055484 A | 3/1995 |
| JP | 2003-021522 A | 1/2003 |
| JP | 2010-210271 A | 9/2010 |
| JP | 2012-132822 A | 7/2012 |
| JP | 2012-181099 A | 9/2012 |
| JP | 2013-185977 A | 9/2013 |
| JP | 2013-242200 A | 12/2013 |
| WO | 2010/033517 A2 | 3/2010 |
| WO | 2012130397 A2 | 10/2012 |
| WO | 2013/145214 A1 | 10/2013 |
| WO | 2014/073028 A1 | 5/2014 |

OTHER PUBLICATIONS

PCT/ISA/237 "Written Opinion of the International Searching Authority for International Application No. PCT/JP2014/055786," dated Jun. 10, 2014.
Europe Patent Office, "Search Report for European Patent Application No. 14884663.7," dated Jan. 5, 2017.
Japan Patent Office, "Office Action for Japanese Patent Application No. 2013-016081," dated Nov. 1, 2016.

DEVICE FOR PROVIDING ELECTRIC-MOVING-BODY INFORMATION AND METHOD FOR PROVIDING ELECTRIC-MOVING-BODY INFORMATION

RELATED APPLICATIONS

The present application is National Phase of International Application No. PCT/JP2014/055786 filed Mar. 6, 2014, the disclosure of which is hereby incorporated by reference herein in its entirety.

TECHNICAL FIELD

The present invention relates to a device for providing electric-moving-body information and a method for providing electric-moving-body information, and particularly, a technique for providing useful information to a user of an electric-moving-body.

BACKGROUND ART

It is interesting for a user of an electric-moving-body, for example, an electric vehicle (EV) to determine whether a desired action can be executed with a current residual amount of battery (referred to as a state of charge (SOC)) (for example, to determine whether the electric-moving-body can reach a destination). In particular, in current technology, there are restrictions in the amount of electric power capable of being accumulated in a battery or efficient charging of the battery. Accordingly, whether a user's desired action can be executed is important information when actually driving an electric vehicle.

PTL 1 (Japanese Unexamined Patent Application Publication No. 2010-210271) discloses a technique for determining whether an electric vehicle can reach a destination with a current SOC with high accuracy. In the technique disclosed in PTL 1, the amount of electric power consumed by vehicle auxiliary devices is estimated based on environment information on a path from a current place to a destination, and it is determined whether the electric vehicle can reach the destination in consideration of the amount of electric power consumed by the vehicle auxiliary devices.

PTL 1 discloses a technique for calculating an SOC after reaching a destination in a case where it is determined that an electric vehicle can reach the destination, and calculating a distance capable of being traveled by the electric vehicle with an SOC after reaching the destination. By displaying a value obtained by adding the distance capable of being traveled by the electric vehicle with the SOC after reaching the destination to a distance of a path from a current place to the destination on a display as a travelable distance, it is possible to easily cause a driver to recognize a suitable charging time after the electric vehicle reaches the destination, to thereby enhance convenience.

However, according to reviews of the inventors, a technique for displaying a travelable distance obtained by adding the distance capable of being traveled by the electric vehicle with the SOC after reaching the destination and the distance of the path from the current place to the destination has problems to be improved in view of providing more useful information for determination of actions capable of being executed after reaching the destination.

CITATION LIST

Patent Literature

[PTL 1] Japanese Unexamined Patent Application Publication No. 2010-210271

SUMMARY OF INVENTION

Technical Problem

Accordingly, an object of the invention is to provide a device for providing electric-moving-body information and a method for providing electric-moving-body information capable of providing more useful information for determination of actions capable of being executed after reaching a destination to a user.

Solution to Problem

According to an aspect of the invention, there is provided a device for providing electric-moving-body information that provides information relating to an electric-moving-body, including: a calculation unit that calculates, with respect to a state of charge (SOC) of the electric-moving-body at a specific point, a plurality of reachable points capable of being reached by the electric-moving-body in a case where the electric-moving-body departs from a destination after the electric-moving-body reaches the destination from the specific point; and a display data generation unit that generates display data for displaying a reachable range display screen where the plurality of reachable points is visually recognizable.

It is preferable that a closed curve that passes through the plurality of reachable points is displayed on the reachable range display screen. Here, it should be noted that the closed curve also includes a combination of line segments. Further, in a case where two of the plurality of reachable points have different distances with respect to the destination, the closed curve is drawn so as not to become a circle.

It is preferable that paths from the destination to the plurality of reachable points are displayed on the reachable range display screen. Further, it is preferable that a path from the departure point to the destination is displayed on the reachable range display screen. In addition, it is preferable that an inner portion of the closed curve is displayed with a color tone different from that of an outer portion of the closed curve on the reachable range display screen.

In an embodiment, the calculation unit determines a plurality of next destinations to surround the destination, sets the destination as a next departure point, performs a traveling simulation for simulating traveling of the electric-moving-body from the next departure point to the next destinations, and calculates the plurality of reachable points as points capable of being reached in a case where the electric-moving-body departs from the next departure point on a path for reaching each of the plurality of next destinations from the next departure point. In this case, it is preferable that the calculation unit calculates an SOC of the electric-moving-body at the destination and determines the plurality of next destinations so that distances between the destination and the plurality of next destinations depend on the SOC of the electric-moving-body at the destination.

Further, the calculation unit may perform the traveling simulation using a road network model that represents a road network using nodes indicating intersections and links indicating roads that connect the nodes. Furthermore, the calculation unit may determine a plurality of next destination ranges to surround the destination, and may determine a node included in each of the next destination ranges as the next destination. In this case, it is preferable that the calculation unit calculates an SOC of the electric-moving-body at the destination and determines the plurality of next destination ranges so that a distance between the destination and each of the plurality of next destination ranges depends on the SOC of the electric-moving-body at the destination. Further, in a case where a node of the road network model is not included in a specific next destination range among the plurality of next destination ranges, the calculation may adjust the size and/or the position of the specific next destination range.

In an embodiment, the calculation unit may set the destination as a next departure point, may determine a plurality of next destinations to surround the destination, may perform a traveling simulation for simulating traveling of the electric-moving-body from the next departure point to the next destinations using a road network model that represents a road network using nodes indicating intersections and links indicating roads that connect the nodes, and may calculate the plurality of reachable points as points capable of being reached in a case where the electric-moving-body departs from the next departure point on a path for reaching each of the plurality of next destinations from the next departure point. Here, in determination of the plurality of next determinations, the calculation unit may set a plurality of next destination ranges to surround the destination, may determine, with respect to a next destination range where at least one node of the road network model is included among the plurality of next destination ranges, the at least one node as the next destination, may change a road-absent next destination range set in a region where a road is not present among the plurality of next destination ranges to include the at least one node of the road network model to determine a changed next destination range, and may determine a node included in the changed next destination range as the next destination. In this case, it is preferable that the calculation unit determines a virtual reachable position disposed between the next destination and a position of the road-absent next destination range in a case where it is determined through the traveling simulation that the electric-moving-body can reach the next destination determined from the changed next destination range from the next departure point. Further, it is preferable that the calculation determines the closed curve so that the closed curve passes through the plurality of reachable points and the virtual reachable position.

Each of the plurality of reachable points may be calculated as a point where the SOC of the electric-moving-body becomes a specific value.

Further, as an example, "the specific point" is a current place position where the electric-moving-body is currently positioned, and the SOC of the electric-moving-body provided to the calculation unit is a current SOC of the electric-moving-body.

According to another aspect of the invention, there is provided a method for providing electric-moving-body information for providing information relating to an electric-moving-body, including: a step of calculating, with respect to a state of charge (SOC) of the electric-moving-body at a specific point, a plurality of reachable points capable of being reached by the electric-moving-body in a case where the electric-moving-body departs from a destination after the electric-moving-body reaches the destination from the specific point; and a step of generating display data for displaying a reachable range display screen where the plurality of reachable points is visually recognizable.

In an embodiment, it is preferable that the step of calculating the plurality of reachable points includes a step of determining a plurality of next destinations to surround the destination, a step of setting the destination as a next departure point, and a step of performing a traveling simulation for simulating traveling of the electric-moving-body from the next departure point to the next destinations. In this case, it is preferable that the plurality of reachable points are calculated as points capable of being reached in a case where the electric-moving-body departs from the next departure point on a path for reaching each of the plurality of next destinations from the next departure point, through the traveling simulation.

According to still another aspect of the invention, there is provided a program used for providing information relating to an electric-moving-body. The program causes a calculation unit to execute a step of calculating, with respect to a state of charge (SOC) of the electric-moving-body at a specific point, a plurality of reachable points capable of being reached by the electric-moving-body in a case where the electric-moving-body departs from a destination after the electric-moving-body reaches the destination from the specific point; and a step of generating display data for displaying a reachable range display screen where the plurality of reachable points is visually recognizable.

According to the device for providing electric-moving-body information, the method for providing electric-moving-body information, and the program according to the invention, it is possible to provide more useful information for determination of actions capable of being executed after reaching a destination to a user.

DESCRIPTION OF EMBODIMENTS

Figure 1:
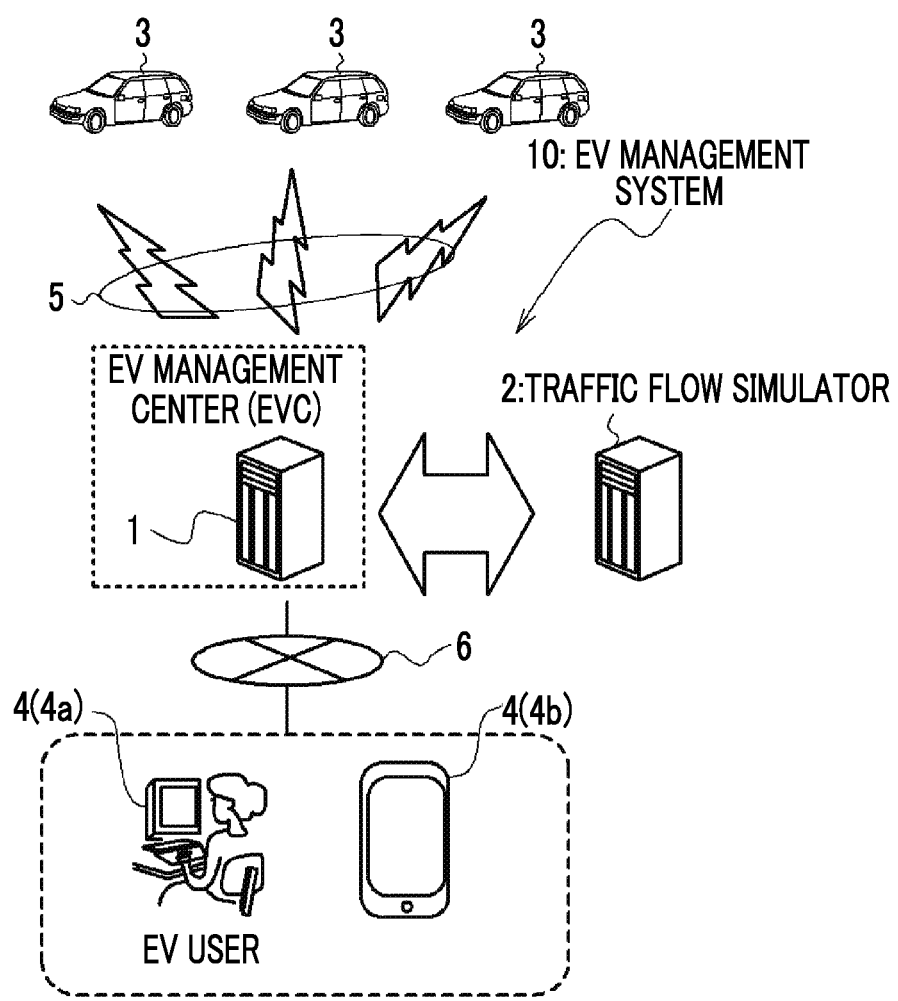
FIG. 1 is a conceptual diagram illustrating a configuration of an EV management system that functions as a device for providing electric-moving-body information according to an embodiment of the invention.

FIG. 1 is a conceptual diagram illustrating a configuration of an EV management system 10 that functions as a device for providing electric-moving-body information according to an embodiment of the invention. The EV management system 10 includes a host computer 1 provided in an electric vehicle management center (EVC), and a traffic flow simulator 2.

The host computer 1 includes a function of detecting and managing a state of an electric-moving-body which is an electric vehicle 3 in this example, and a function of providing a variety of information relating to the electric vehicle 3 to a user of the electric vehicle 3 (EV user). Specifically, the host computer 1 communicates with the electric vehicle 3 through a wireless communication network 5, and collects probe information from the electric vehicle 3. Here, the probe information refers to information indicating a state of each electric vehicle 3, and for example, includes information indicating a state of charge (SOC) or position information indicating a current position of each electric vehicle 3.

In addition, the host computer 1 is connected to be able to communicate with a user terminal 4 operated by the EV user through a network 6. As the user terminal 4, for example, a personal computer 4a may be used, or a portable terminal 4b such as a mobile phone or a smart phone may be used. The host computer 1 receives a request from the user terminal 4, and provides information relating to the electric vehicle 3 associated with the request to the user terminal 4. As described later in detail, in this embodiment, the host computer 1 is configured to provide information relating to whether the electric vehicle 3 can reach a destination to the user terminal 4, and to transmit display data for displaying a reachable range display screen indicating a range capable of being reached by the electric vehicle 3 to the user terminal 4 after the electric vehicle 3 reaches the destination.

The traffic flow simulator 2 is a computer used for performing a traveling simulation of the electric vehicle 3. Through the traveling simulation of the electric vehicle 3, determination of whether the electric vehicle 3 can reach the destination is performed, and after the electric vehicle 3 reaches the destination, a range capable of being reached when the electric vehicle 3 departs from the destination using the destination as a next departure point is calculated.

Figure 2:
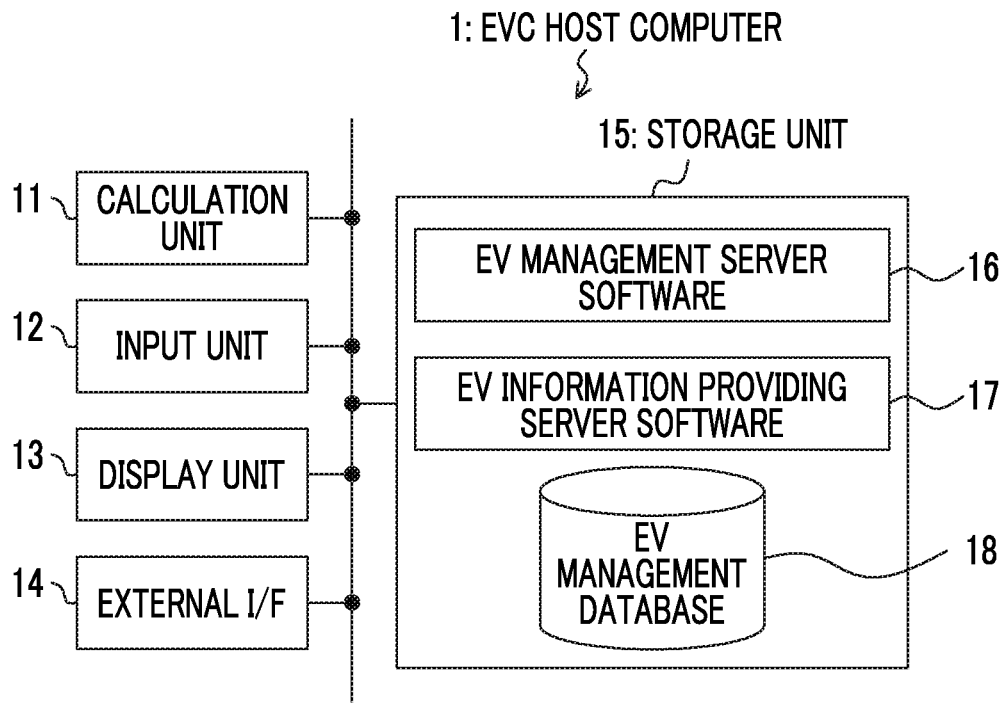
FIG. 2 is a diagram illustrating an example of a configuration of a host computer provided in an EV management center in the embodiment.

FIG. 2 is a diagram illustrating an example of a configuration of the host computer 1. The host computer 1 includes a calculation unit 11, an input unit 12, a display unit 13, an external interface 14, and a storage unit 15. The calculation unit 11 performs a variety of data processing for managing the electric vehicle 3, and a variety of data processing for providing information relating to the electric vehicle 3 to the user terminal 4. As the calculation unit 11, for example, one or plural central processing units (CPUs) may be used. The input unit 12 is operated by a manager of the host computer 1, and receives data input through a variety of operations. The display unit 13 displays various images according to an operation of the host computer 1. The input unit 12 and the display unit 13 function as a man-machine interface of the host computer 1.

The external interface 14 is an interface for being connected to external communication means (for example, the wireless communication network 5 and the network 6). The host computer 1 performs communication with the traffic flow simulator 2, the electric vehicle 3, and the user terminal 4 through the external interface 14.

The storage unit 15 stores a program for operating the calculation unit 11, and stores a variety of data necessary for data processing using the calculation unit 11. In this embodiment, EV management server software 16 and EV information providing server software 17 are installed in the storage unit 15, and an EV management database 18 is stored in the storage unit 15.

The EV management server software 16 is a program for causing the host computer 1 to function as an EV server that manages the electric vehicle 3. The EV management server has a function of collecting probe information from the electric vehicle 3 and storing the collected probe information of each electric vehicle 3 and a vehicle ID of each electric vehicle 3 in the EV management database 18 so that the collected probe information and the vehicle ID are associated with each other.

The EV information providing server software 17 is a program for causing the host computer 1 to function as an EV information providing server that provides the information relating to the electric vehicle 3 to the user terminal 4. In this embodiment, the EV information providing server includes a function of providing information indicating whether the electric vehicle 3 can reach a destination to the user terminal 4 and transmitting display data for displaying a reachable range display screen indicating a range capable of being reached by the electric vehicle 3 after reaching the destination to the user terminal 4. The EV information providing server may be provided as a Web server.

The host computer 1 may not only be provided as a single computer, but may also be provided as a series of computing resources (a network, a server, a storage, and an application) that realize ground computing.

Figure 3:
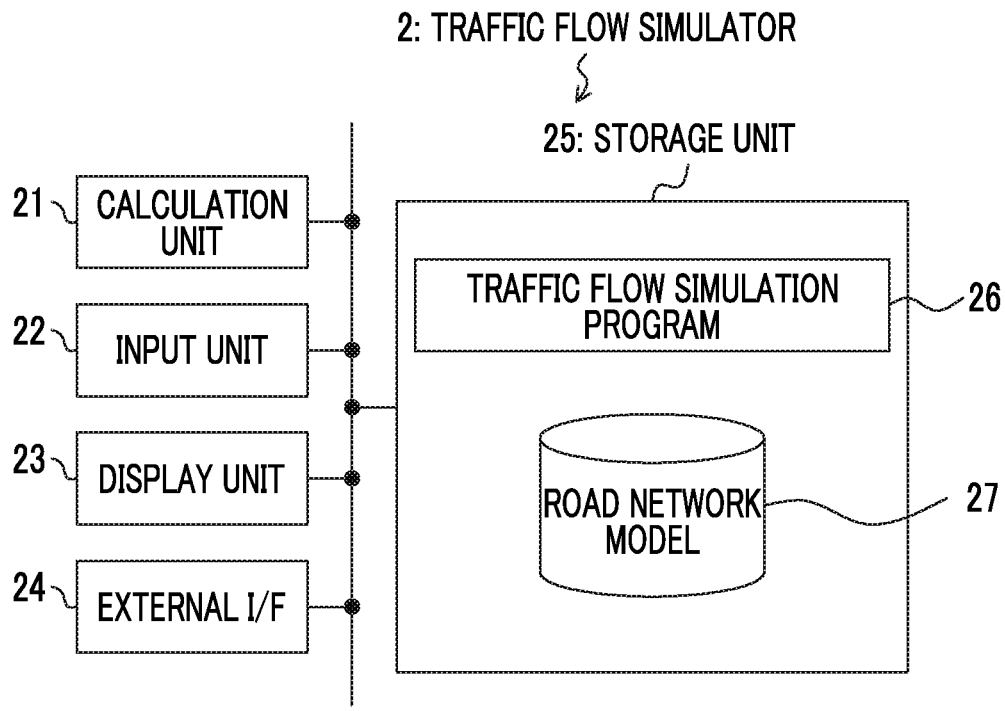
FIG. 3 is a diagram illustrating an example of a configuration of a traffic flow simulator in the embodiment.

FIG. 3 is a diagram illustrating an example of a configuration of the traffic flow simulator 2. The traffic flow simulator 2 includes a calculation unit 21, an input unit 22, a display unit 23, an external interface 24, and a storage unit 25. The calculation unit 21 performs a variety of data processing for performing a traveling simulation of the electric vehicle 3. As the calculation unit 21, for example, one or plural central processing units (CPUs) may be used. The input unit 22 is operated by a manager of the traffic flow simulator 2, and receives data input through a variety of operations. The display unit 23 displays various images according to an operation of the traffic flow simulator 2. The input unit and the display unit 23 function as a man-machine interface of the traffic flow simulator 2.

The external interface 24 is an interface for being connected to external communication means. The traffic flow simulator 2 performs communication with the host computer 1 through the external interface 24.

The storage unit 15 stores a program for operating the calculation unit 21, and stores a variety of data necessary for data processing using the calculation unit 21. In this embodiment, in the storage unit 15, a traffic flow simulation program 26 is installed, and a road network model 27 is stored.

The traffic flow simulation program 26 is a program for causing the calculation unit 21 to execute a traveling simulation of the electric vehicle 3. Through the traveling simulation using the traffic flow simulation program 26, determination of whether the electric vehicle can reach a destination is performed, and after the electric vehicle 3 reaches the destination, a range capable of being reached when the electric vehicle 3 departs from the destination using the destination as a next departure point is calculated. Here, the traffic flow simulation program 26 (including the electric vehicle 3) includes a function of simulating a traffic flow generated when multiple vehicles travel on a road. Accordingly, in a situation where a traffic flow is present, it is possible to determine whether the electric vehicle 3 can reach a destination. Further, in a situation where the traffic flow is present, after the electric vehicle 3 reaches the destination, it is possible to calculate a reachable range when the electric vehicle 3 departs from the destination using the destination as a next departure point.

Figure 4:
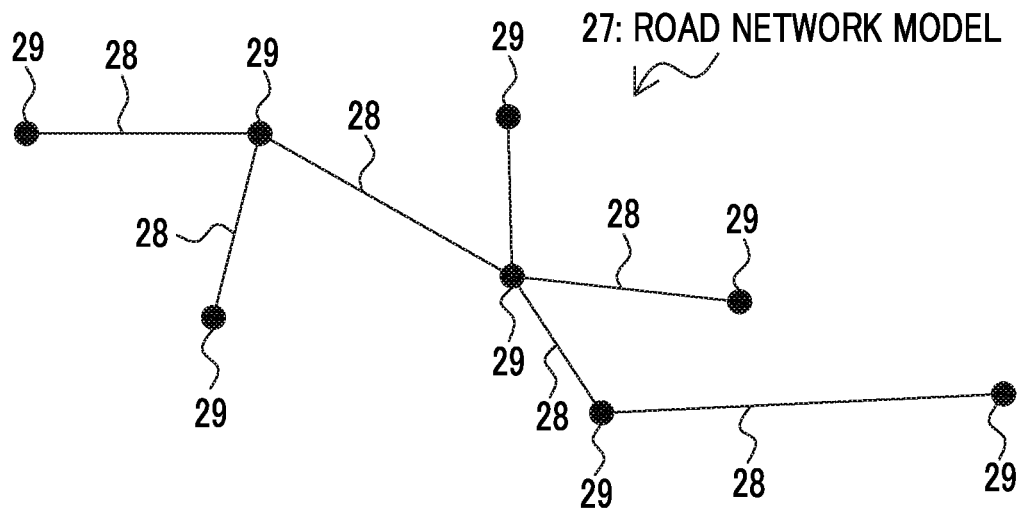
FIG. 4 is a conceptual diagram illustrating an example of a road network model.

The road network model 27 is a model obtained by simulating a road network, and is used in a traveling simulation using the traffic flow simulation program 26. FIG. 4 is a schematic diagram illustrating content of the road network model 27. The road network model 27 includes links 28 and nodes 29, and represents a road network using the links 28 and the nodes 29. The node 29 indicates an intersection, and the link 28 indicates a road that connects two intersections (that is, a road that connects the nodes 29). Information indicating a structure of a road (for example, information indicating the number of lanes, the presence or absence of a right-turn or left-turn lane, the number thereof, and the like) is set in each link 28. Further, information indicating a structure of an intersection (information indicating the presence or absence of installation of a traffic signal, or the like) is set in the node 29. In addition, an elevation may be set in each node 29. Here, a slope of a road corresponding to the link 28 connecting two nodes 29 may be determined from a difference between elevations of two adjacent nodes 29. By determining the slope of the road corresponding to the link 28, it is possible to precisely calculate electric energy consumed by the electric vehicle 3 when traveling the road. Furthermore, the weather (fine, rainy, and snowy), and the temperature may be set in the road network model 27. This enables estimation of electric energy consumed by a vehicle auxiliary machine (an air conditioner, a heater, a wiper, or the like) mounted on the electric vehicle 3, and contributes to precise calculation of electric energy consumed by the electric vehicle 3.

Similar to the host computer 1, the traffic flow simulator 2 may not only be provided as a single computer, but may also be realized as a series of computing resources (a network, a server, a storage, and an application) that realize ground computing.

Subsequently, an operation of the EV management system 10 of this embodiment, particularly, data processing in the host computer 1 and the traffic flow simulator 2 will be described. In this embodiment, the EV information providing server operated by the host computer 1 provides information indicating whether the electric vehicle 3 can reach a destination from a departure point (which may be a current place) to a user terminal 4 of an EV user. In addition, the EV information providing server performs an operation of providing display data for displaying a reachable range display screen that displays a range capable of being reached by the electric vehicle 3 after the electric vehicle 3 reaches a destination and then departs from the destination using the destination as a next departure point to the user terminal 4. The user terminal 4 receives the display data, and displays the reachable range display screen.

Figure 11:
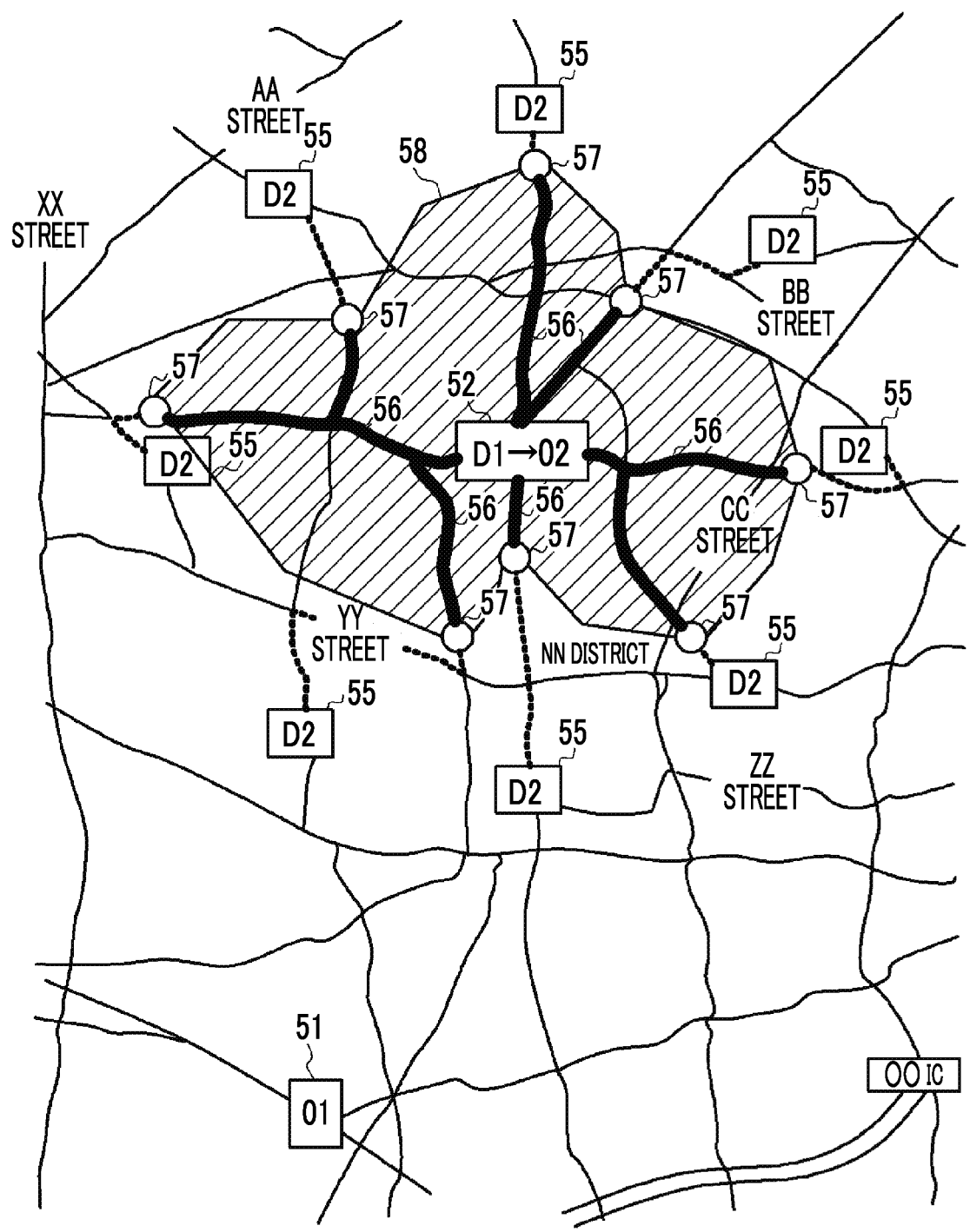
FIG. 11 is a diagram illustrating another example of the reachable range display screen in the embodiment.

One feature of the reachable range display screen is that a point (hereinafter, referred to as a "reachable point") confirmed as a point capable of being reached by the electric vehicle 3 when departing from a destination using the destination as a next departure point through a traveling simulation of the traffic flow simulator 2 is generated to be visually recognizable. For example, the reachable point may be determined as a point where the SOC of a battery becomes a specific value (which may be 0%) in a case where the electric vehicle 3 reaches a destination, and then, departs from the destination to reach each reachable point. In an embodiment, the specific value is set to 0% (that is, the SOC of the battery is zero). In this case, the reachable point is defined as a non-electricity point which is a point where the SOC of the battery of the electric vehicle 3 becomes zero (that is, the SOC becomes 0%) in a case where the electric vehicle 3 reaches a destination, and then, departs from the destination using the destination as a next departure point again. An example of the reachable range display screen is shown in FIG. 11 (details thereof will be described later).

According to the reachable range display screen, after the electric vehicle 3 reaches a destination, when the electric vehicle 3 wants to move again, an EV user can recognize in detail a range capable of being reached from the destination. This is useful for determination of an action capable of being executed by the EV user after the electric vehicle reaches the destination.

Figure 5:
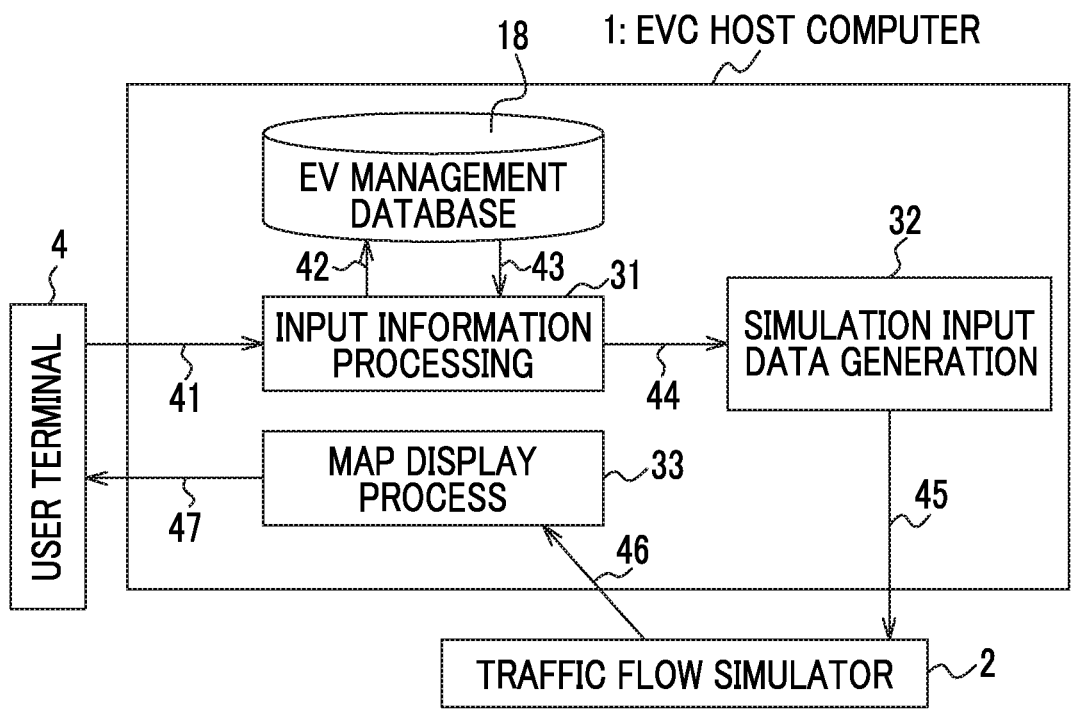
FIG. 5 is a functional block diagram illustrating data processing using the host computer in the embodiment.

Hereinafter, an operation of the host computer 1 as the EV information providing server will be described in detail. FIG. 5 is a block diagram illustrating an example of the operation of the host computer 1 as an EV information providing server.

The user terminal 4 has a function of transmitting a reachability determination request 41 for asking whether the electric vehicle 3 can reach a destination to the host computer 1 according to an operation of an EV user. In a case where the EV information providing server is a Web server, such a function may be realized by accessing a Web site provided by the EV information providing server using a Web browser of the user terminal 4. The reachability determination request 41 includes user information and destination information indicating a destination. The user information includes a vehicle ID for specifying the electric vehicle 3. Further, in a case where a user desires to know whether the electric vehicle 3 can reach a destination with respect to a current position of the electric vehicle 3 (the current place position) and a current SOC, the reachability determination request 41 may include information indicating the user's desire. Further, in a case where the electric vehicle 3 positioned at a specific departure point position at a specific departure time point departs from the departure point position with a specific SOC, and in a case where the user desires to know whether the electric vehicle 3 can reach a destination, the reachability determination request 41 may include information indicating the user's desire, departure time point information indicating the departure time point, departure point information indicating a departure point position, and SOC information indicating the specific SOC. For example, in a case where the user desires to know whether the electric vehicle 3 can reach a destination after performing full charge at a specific charging station, the reachability determination request is generated to include a departure point position indicating the position of the charging station and SOC information indicating that the SOC is 100%.

If the host computer 1 receives the reachability determination request 41, the host computer 1 performs input information processing 31. Specifically, in the input information processing 31, the EV management database 18 is retrieved using the vehicle ID included in the user information of the reachability determination request 41, and latest probe information 43 of the electric vehicle 3 corresponding to the vehicle ID is acquired. In FIG. 5, user information used for retrieval of the EV management database 18 is indicated by reference numeral 42. The acquired latest probe information 43 includes information indicating a current SOC of the electric vehicle 3 and current place information indicating a current position of the electric vehicle 3. In the input information processing 31, a simulation request 44 including information acquired in the input information processing 31 (that is, the reachability determination request 41 and the latest probe information 43) is generated, and the simulation request 44 is provided for a simulation input data generation process 32.

In the simulation input data generation process 32, input data 45 having a data format suitable for the traffic flow simulator 2 is generated based on the simulation request 44. The input data 45 includes departure point information indicating the position of a departure point, destination information indicating the position of a destination, and SOC information indicating the SOC of the electric vehicle 3 at the departure point. The input data 45 is transmitted to the traffic flow simulator 2.

Here, a method of generating the input data 45 varies according to content of the reachability determination request 41 included in the simulation request 44. In a case where the reachability determination request 41 indicates that a user desires to know whether the electric vehicle 3 can reach a destination with respect to a current position of the electric vehicle 3 (current place position) and a current SOC, departure point information is generated to indicate the current position of the electric vehicle 3 shown in the latest probe information, and SOC information of the input data 45 is generated to indicate an SOC shown in the latest probe information. That is, the input data 45 for requesting to determine whether the electric vehicle 3 can reach a destination with a current SOC using the position of a current position of the electric vehicle 3 as a departure point is generated. On the other hand, in a case where the reachability determination request 41 indicates that a user desires to know whether the electric vehicle 3 can reach a destination with respect to a specific position of the electric vehicle 3 (departure point position) and a specific SOC, departure point information is generated to indicate the specific position, and SOC information of the input data 45 is generated to indicate the specific SOC. That is, in a case where the specific position is a departure point and the SOC of the electric vehicle 3 is the specific SOC at the departure point, the input data 45 for requesting to determine whether the electric vehicle 3 can reach the destination is generated.

The traffic flow simulator 2 performs a traveling simulation based on the transmitted input data 45, and returns simulation result data 46 indicating the traveling simulation result to the host computer 1. In the traveling simulation, the road network model 27 stored in the storage unit 25 of the traffic flow simulator 2 is used.

Figure 6:
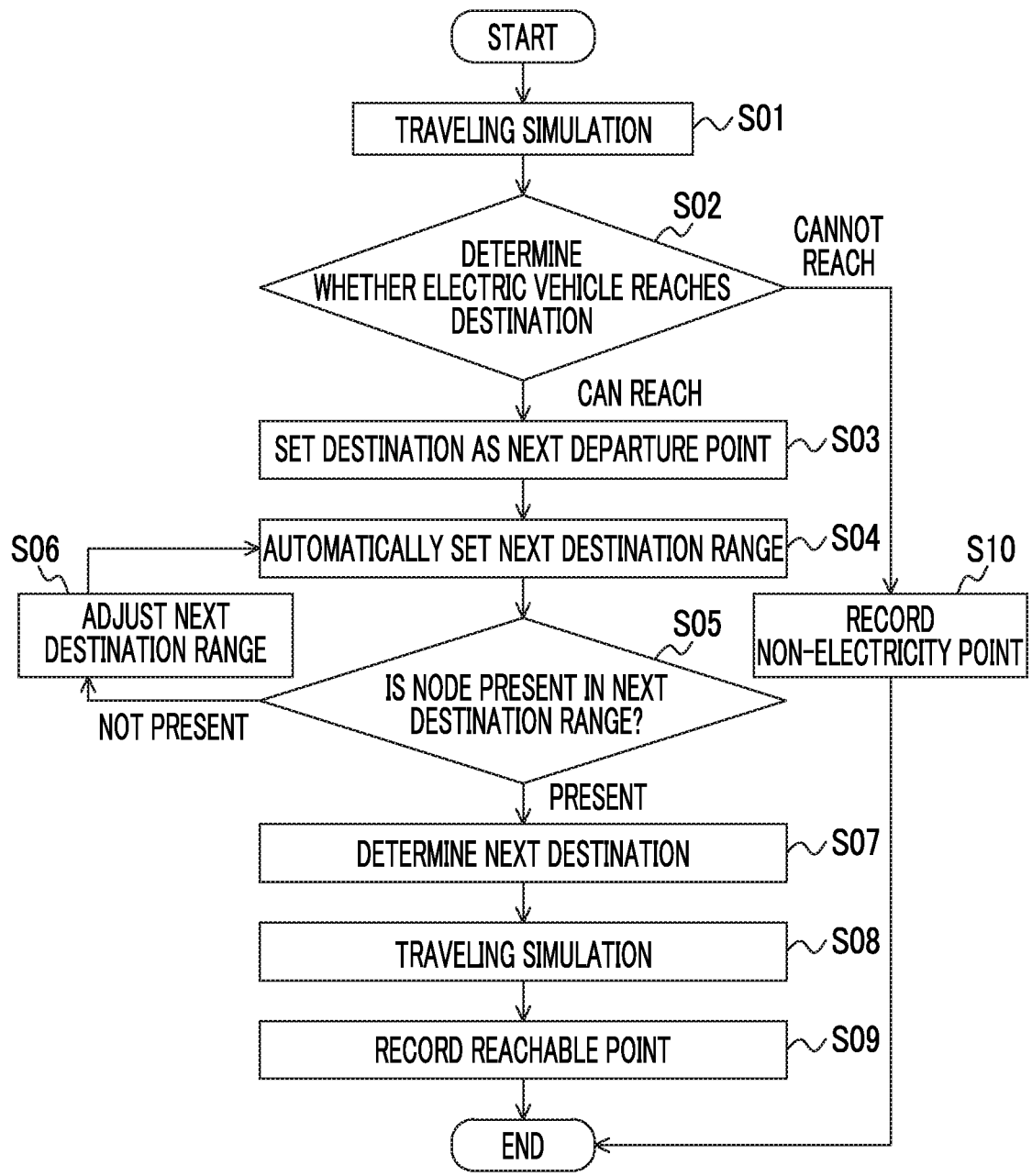
FIG. 6 is a flowchart illustrating data processing using the traffic flow simulator in the embodiment.

FIG. 6 is a flowchart illustrating processes using the traffic flow simulator 2. First, a traveling simulation is performed (step S01), and in a case where an SOC at a departure point indicated by departure point information is an SOC indicated by SOC information, it is determined whether the electric vehicle 3 can reach a destination indicated by destination information from the departure point (step S02). In a case where it is determined that the electric vehicle 3 cannot reach the destination in the traveling simulation, a point (non-electricity point) where the SOC of the battery of the electric vehicle 3 becomes 0% is recorded (step S09), and the simulation result data 46 is generated to include information indicating that the electric vehicle 3 cannot reach the destination and non-electricity point information indicating the non-electricity point. The non-electricity point information may include a traveling time necessary for traveling from the departure point to the non-electricity point. In this case, the information indicating that the electric vehicle 3 cannot reach the destination and the non-electricity point obtained in the traveling simulation are displayed on the user terminal 4.

On the other hand, in a case where it is determined that the electric vehicle 3 can reach the destination, processes of steps S03 to S08 are performed. In the processes of steps S03 to S08, after the electric vehicle 3 reaches the destination, a process of calculating a point (that is, a reachable point) capable of being reached when the electric vehicle 3 departs from the destination using the destination as a next departure point is performed. Here, the number of reachable points calculated in steps S03 to S08 is plural, and the plural reachable points are calculated to be positioned in various directions with respect to the destination and to surround the destination. Hereinafter, the processes of steps S03 to S08 will be described.

First, a destination indicated by destination information of the input data 45 is set as a departure point (next departure point) in the next traveling simulation (step S03). Further, plural next destination ranges are set to surround the next departure point (that is, the destination indicated by the departure point information of the input data 45). Here, the next destination range refers to a range of a position to be set as a destination in the next traveling simulation. It should be noted that the next destination range is automatically set by the traffic flow simulator 2 and is not designated by a user. As understood from the following description of the processes, the next destination range is only a range set for selecting a destination which is provisionally set for calculation of a reachable point. Here, the number of the set next destination ranges may be variably adjusted by a user.

Figure 7:
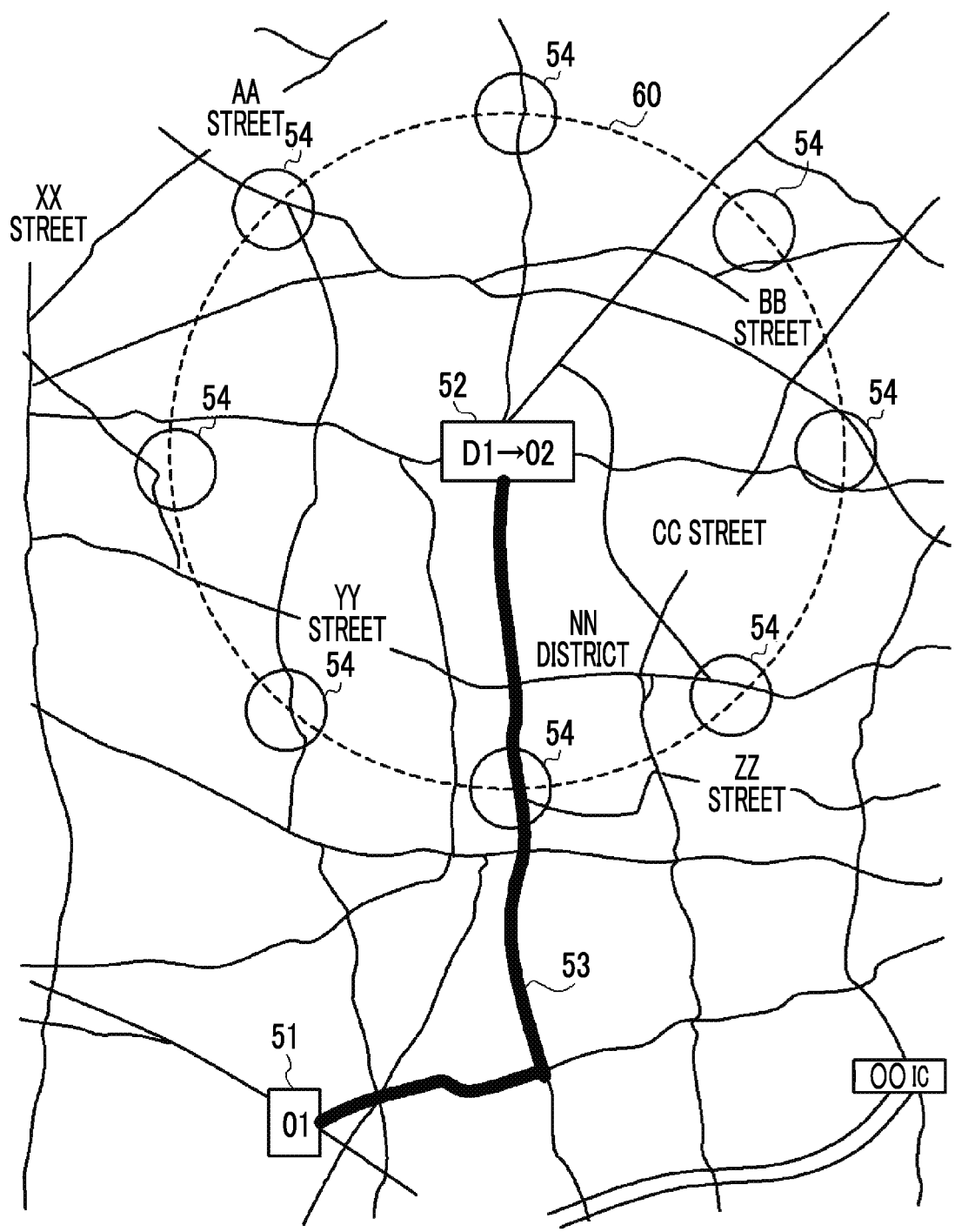
FIG. 7 is a diagram illustrating an example of setting of a next destination range in the embodiment.

FIG. 7 shows an example of the next destination ranges set in step S03. In step S01, a traveling simulation for determining whether the electric vehicle 3 can reach a destination 52 from a departure point 51 is performed. In step S02, it is determined that the electric vehicle 3 can reach the destination 52 from the departure point 51 at a path 53.

In this case, plural next destination ranges 54 are set in a radial pattern to surround the periphery of the destination 52 (that is, next departure point). Here, the next destination ranges 54 are set at positions that are sufficiently separated from the next departure point and are not considered as positions in the next destination ranges from the next departure point capable of being reached by the electric vehicle 3. In an embodiment, the next destination range 54 may be set in a circle or a regular polygon having a certain size. In the example shown in FIG. 7, each next destination range 54 is set as a circle of which the center is positioned on a circle 60 centering around the destination 52. Here, the radius of the circle 60 is determined based on the SOC of the electric vehicle 3 at the destination 52, and is set to be sufficiently larger than the length of a line segment corresponding to a travelable distance expected from the SOC of the electric vehicle 3 at the destination 52. Most simply, the radius of the circle 60 may be determined by multiplying the SOC of the electric vehicle 3 at the destination 52 by a predetermined coefficient.

Subsequently, it is determined whether a node 29 of the road network model 27 is present in each next destination range 54 (step S05). In a case where a next destination range 54 where the node 29 is not present is present, adjustment is performed with respect to the next destination range 54 (step S06). The adjustment of the next destination range 54 is performed by changing the size or position of the next destination range 54. For example, in a case where the next destination range 54 is set as a circle, the adjustment of the next destination range 54 may be performed by changing the position of the center of the circle and/or the radius of the circle. Further, in a case where the next destination range 54 is set as a regular polygon, the adjustment of the next destination range 54 may be performed by changing the position of the center of the regular polygon and/or the distance from the center of the regular polygon to an apex. The adjustment of the next destination range 54 is repeatedly performed until each next destination range 54 is set so that at least one node 29 is included in each next destination range 54.

Figure 8:
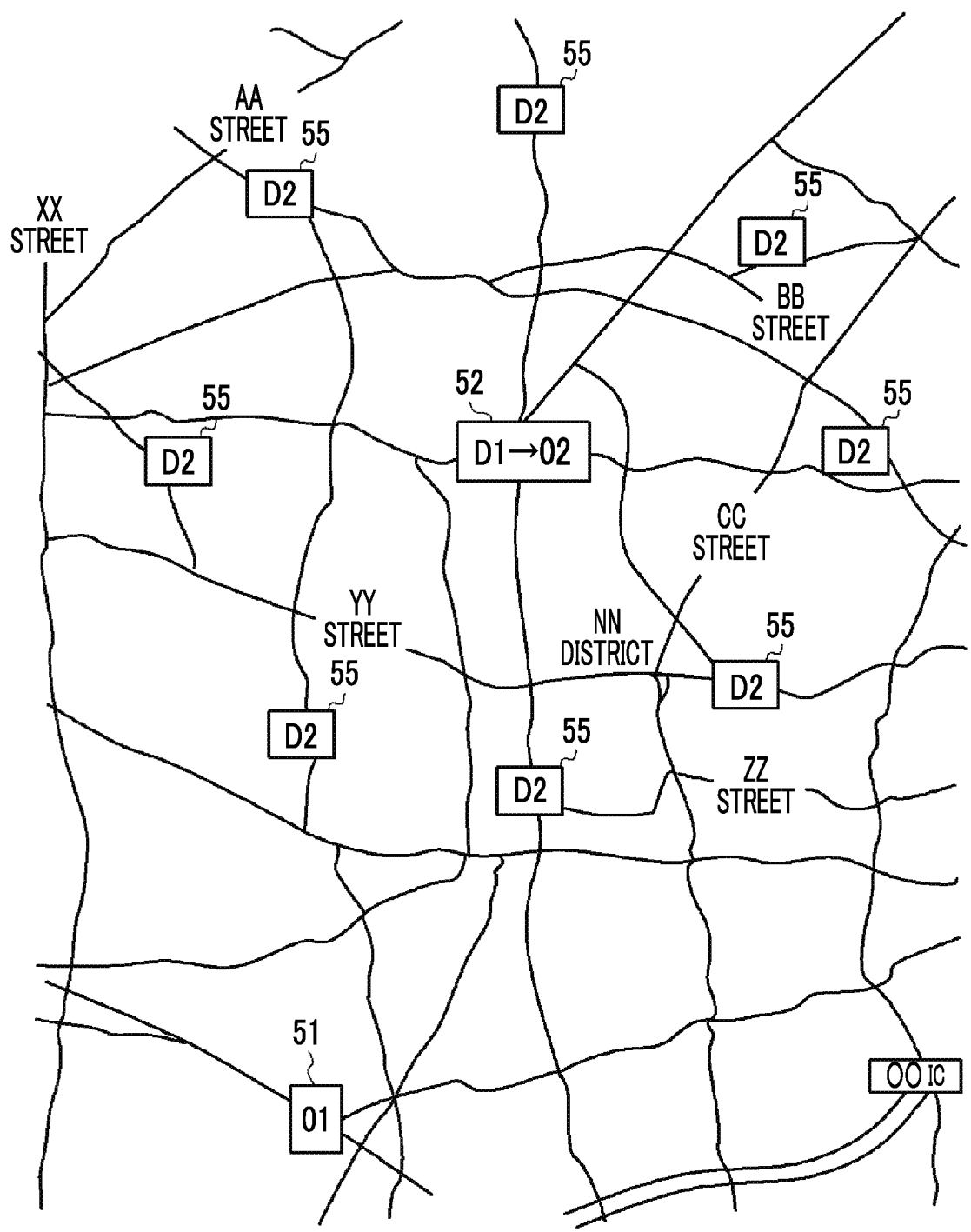
FIG. 8 is a diagram illustrating an example of setting of a next destination in the embodiment.

After the next destination range 54 is determined so that at least one node 29 is included in each next destination range 54, as shown in FIG. 8, a next destination 55 is determined with respect to each next destination range 54 (step S07). In a case where only a single node 29 is present in a certain next destination range 54, the node 29 is determined as the next destination 55. On the other hand, in a case where plural nodes 29 are present in a certain next destination range 54, one node 29 among the plural nodes 29 is selected as the next destination 55. As a result, the next destination 55 is also determined to surround the destination 52 (next departure point).

Subsequently, a traveling simulation for simulating traveling of the electric vehicle 3 from a next departure point (that is, the destination 52) to the next destination 55 is performed (step S08). As an SOC at a next departure point, the SOC of the electric vehicle 3 at the destination 52 obtained in the traveling simulation in step S01 is used.

Here, in step S04, since the next destination ranges are determined at positions that are sufficiently separated from the next destination, in the traveling simulation of step S08, a non-electricity point (a point where an SOC is 0%) is to be determined between the next departure point and the next destination. A point on a path from the next departure point to the non-electricity point is a point for which it is determined that the electric vehicle 3 can reach the point when the electric vehicle 3 departs from the destination using the destination as a next departure point. Any one point on the path from the next departure point to the non-electricity point (including the non-electricity point and excluding the next departure point) is calculated as a "reachable point".

The reachable point may be determined as the non-electricity point, or may be determined as a point where the SOC becomes a specific value (for example, 20%). Further, the reachable point may be determined as a point to which the electric vehicle 3 can reciprocate from a next destination (that is, a point that the electric vehicle 3 reaches when the electric vehicle 3 departs from the next destination, from which the electric vehicle 3 returns to the next destination). Further, the reachable point may be determined as a point on a path from the next departure point to the non-electricity point, which is a point that the electric vehicle 3 reaches at a time point when a predetermined time (for example, 30 minutes) elapses after the electric vehicle 3 departs from the next departure point. Furthermore, the reachable point may be determined as a point on a path from the next departure point to the next non-electricity point, which is a point that the electric vehicle 3 reaches at a time point when the electric vehicle 3 travels by a predetermined travel distance after departing from the next departure point.

Figure 9:
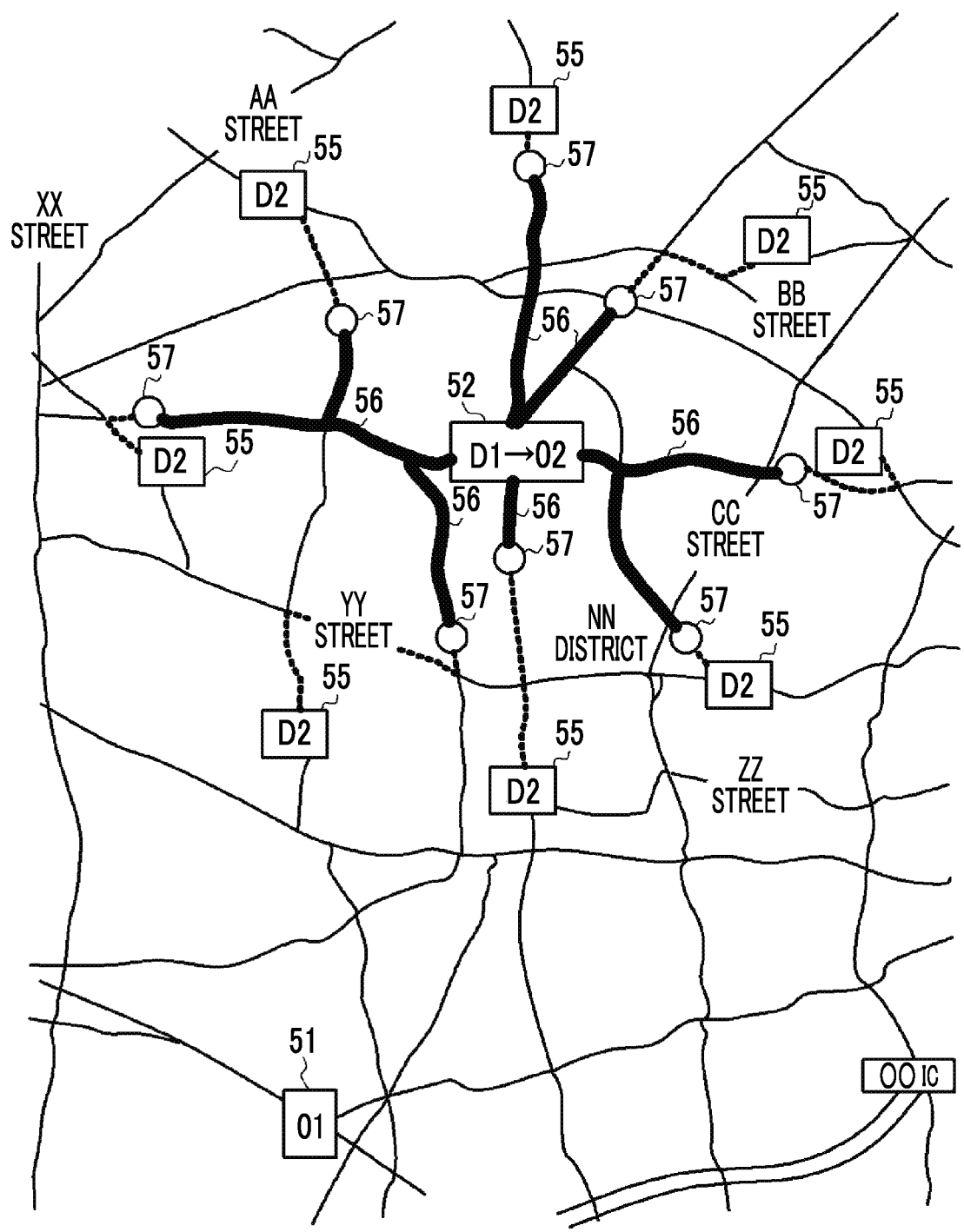
FIG. 9 is a diagram illustrating an example of calculation of a reachable point in the embodiment.

FIG. 9 is a diagram illustrating an example of reachable points 57 determined with respect to each next destination 55. A reachable point passing through a path 56 from the next departure point (that is, the destination 52) is determined as each reachable point 57. In the traveling simulation of step S08, the path 56 for reach each reachable point 57 from the next departure point is specified, and a travel time and/or a travel distance necessary for reaching each reachable point 57 from the next departure point is also calculated.

The reachable point 57 calculated by the traveling simulation of step S08, and information relating thereto (for example, an SOC at the reachable point 57, the path 56 capable of reaching each reachable point 57 from the next departure point, and a travel time necessary for reaching each reachable point 57 from the next departure point) are recorded (step S09), and thus, the processes of the traffic flow simulator 2 are completed.

Further, a result of the processes of the traffic flow simulator 2 is returned to the host computer 1 as simulation result data 46. The simulation result data 46 includes information indicating whether the electric vehicle 3 can reach a destination indicated by destination information from a departure point indicated by departure point information. In addition, the simulation result data 46 includes reachable point data indicating reachable points (after the electric vehicle 3 reaches the destination, points for which it is determined that the electric vehicle 3 can reach the point when the electric vehicle 3 departs from the destination using the destination as a next departure point). Furthermore, the simulation result data 46 may include information relating to the reachable point 57 (for example, the SOC at the reachable point 57, the path 56 capable of reaching each reachable point 57 from the next departure point, and the travel time necessary for reaching each reachable point 57 from the next departure point). The simulation result data 46 may include information indicating the position of the next destination 55 set in step S07.

Returning to FIG. 5, if the simulation result data 46 is returned to the host computer 1, a map display process 33 of generating display data 47 for displaying a reachable range display screen is performed. Here, as described above, the reachable range display screen is a screen for displaying ranges capable of being reached by the electric vehicle 3 when the electric vehicle 3 departs from the destination using the destination as a next departure point after the electric vehicle 3 reaches the destination. The display data 47 is transmitted to the user terminal 4, and the reachable range display screen corresponding to the display data 47 is displayed on the user terminal 4.

Figure 10:
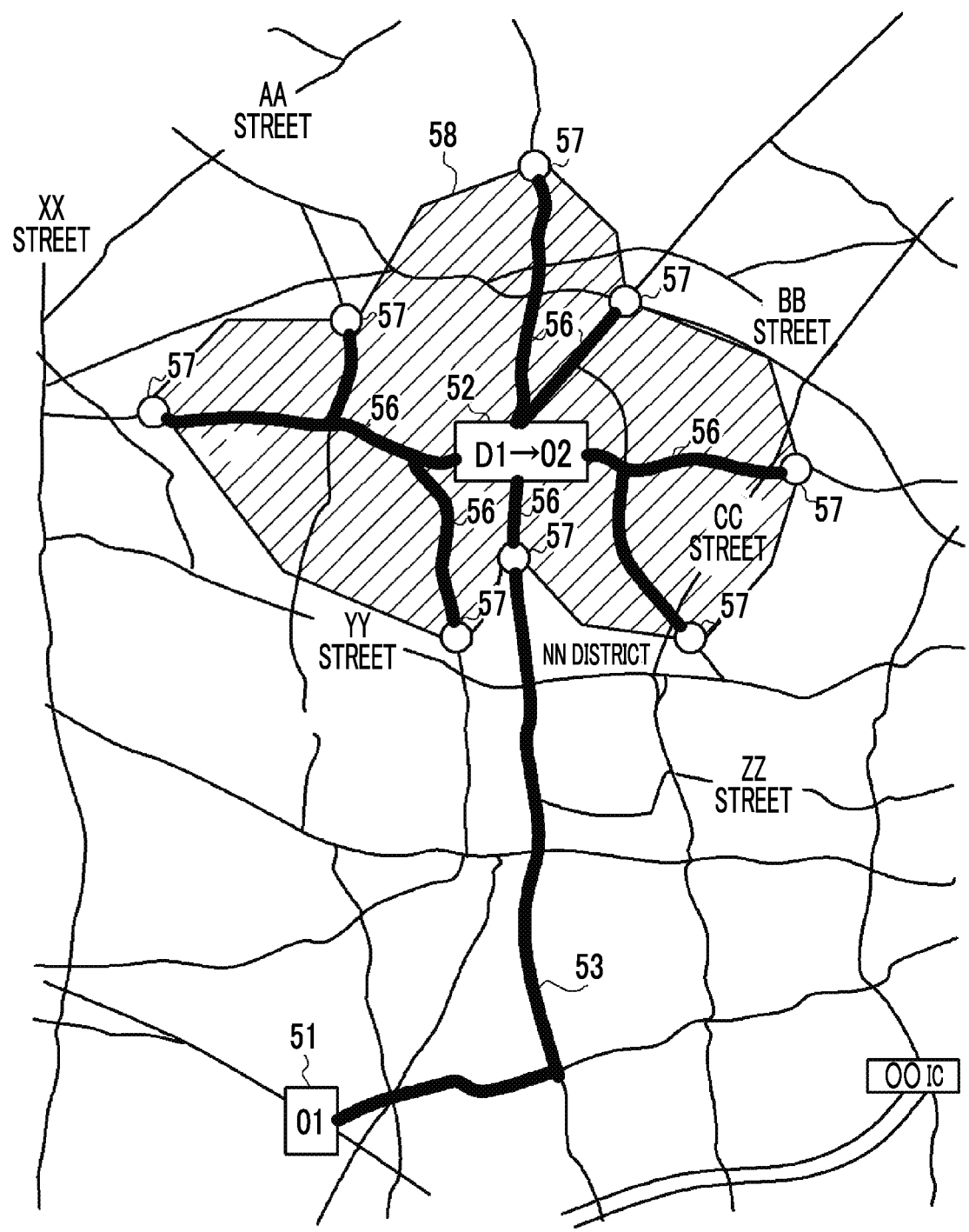
FIG. 10 is a diagram illustrating an example of a reachable range display screen in the embodiment.

FIG. 10 is a diagram illustrating an example of a reachable range display screen. In the reachable range display screen in FIG. 10, the departure point 51, the destination 52, the path 53 that connects the departure point 51 to the destination 52, the reachable points 57, and a boundary line 58 are shown. In the example shown in FIG. 10, the boundary line 58 is indicated as a closed curve that passes through the reachable points 57 and surrounds the destination 52 (that is, a next departure point). Most simply, the closed curve used as the boundary line 58 may be formed by connecting line segments that connect adjacent reachable points 57. Further, the closed curve used as the boundary line 58 may be drawn as an arbitrary approximate curve, for example, a Bezier curve using the reachable point 57 as a control point. The order of the Bezier curve may be appropriately determined in consideration of the accuracy of the boundary line 58 or the number of reachable points 57. In FIG. 10, the boundary line 58 is formed by connecting curves that connect the adjacent reachable points 57, in which each curve is formed by connecting plural segment lines.

Further, reachable ranges capable of being reached from a next departure point may be displayed on the reachable range display screen. In this case, an inner portion of the boundary line 58 may be displayed with a color tone different from that of an outer portion of the boundary line 58 to display the reachable ranges.

It is not essential that the boundary line 58 is displayed. If a sufficient number of reachable points 57 are displayed, a user may recognize reachable ranges capable of being reached from a next departure point, in reality. Further, only the boundary line 58 is displayed, and a mark indicating each reachable point 57 may not be displayed. Even in this case, the reachable point 57 may be visually recognized as a position where a road that forms each path 56 and the boundary line 58 intersect.

FIG. 11 shows another example of the reachable range display screen. As shown in FIG. 11, the next destinations 55 determined in step S07 may be displayed on the reachable range display screen. Here, as described above, since the next destinations 55 are points which are automatically set by the traffic flow simulator 2 (which are not points set by a user), it should be noted that a necessity that the next destination 55 is displayed is small.

Figure 12:
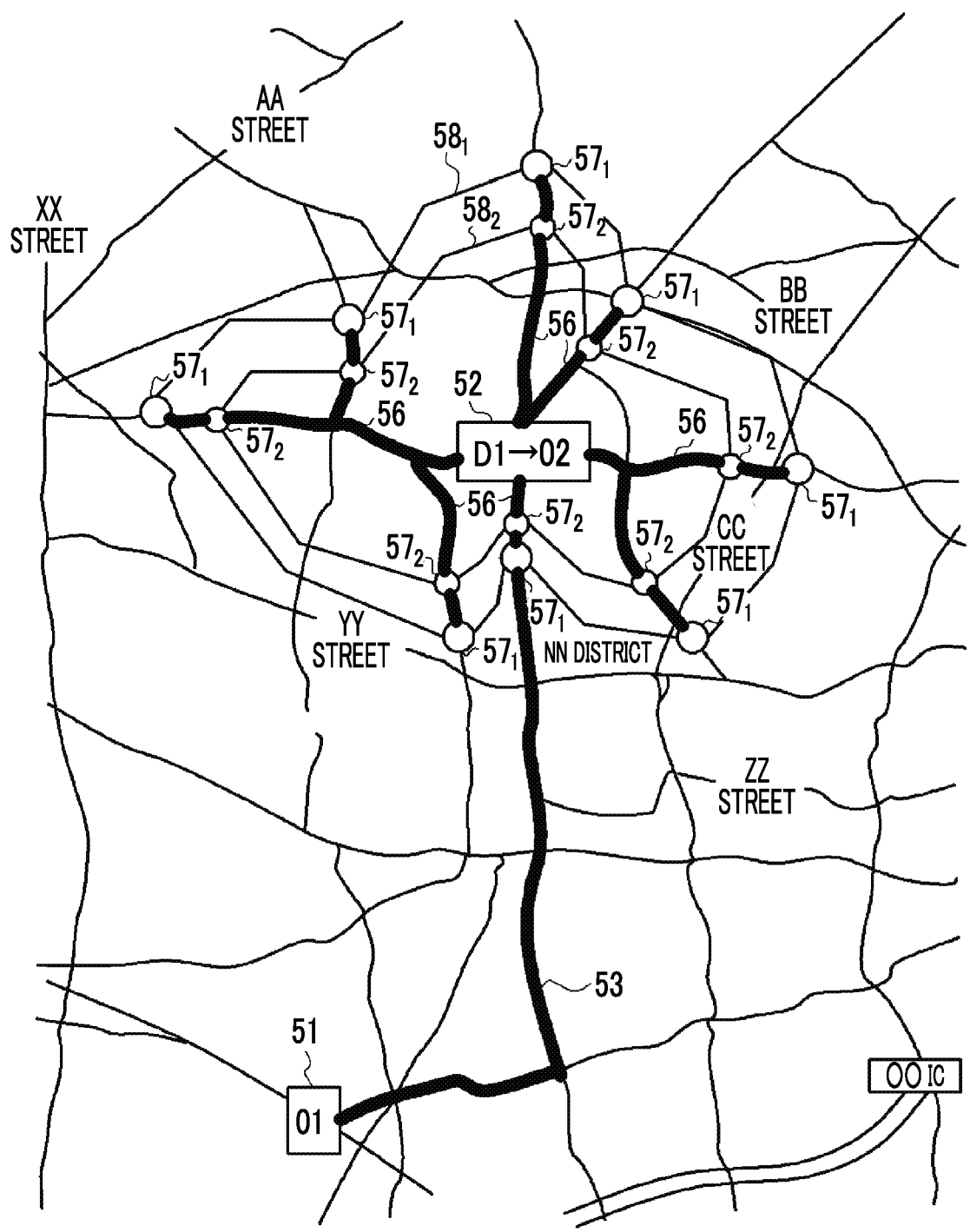
FIG. 12 is a diagram illustrating still another example of the reachable range display screen in the embodiment.

FIG. 12 shows still another example of the reachable range display screen. In the traveling simulation of step S08 according to this embodiment, with respect to each non-electricity point, plural reachable points may be determined between a next departure point and the non-electricity point under different conditions, and may be displayed on the reachable range display screen. In this case, reachable points corresponding to the same condition may be connected by a closed curve, and thus, the reachable ranges may be displayed as a chart similar to a radar chart on the reachable range display screen. As parameters used for determination of the reachable points, an SOC, a time elapsed after departing from a next departure point, and a traveling distance after departing from the next departure point may be used.

In the example of FIG. 12, in a traveling simulation, a point where an SOC is a first value (for example, 10%) is determined as a reachable point $57_1$, and a point where an SOC is a second value (for example, 20%) different from the first value is determined as a reachable point $57_2$. Latitude and longitude information of the reachable points $57_1$ and $57_2$ is stored in the storage unit 25 of the traffic flow simulator 2. A boundary line $58_1$ is indicated by a closed curve that passes through the reachable point $57_1$, passes through the reachable point 57, and surrounds the destination 52 (that is, a next departure point). Similarly, a boundary line $58_2$ is indicated by a closed curve that passes through the reachable point $57_2$, and surrounds the destination 52 (that is, the next departure point). In the example shown in FIG. 12, reachable points are calculated with respect to two SOC values, but reachable points may be calculated with respect to three or more SOC values.

The same reachable range display screen may be generated with respect to a time elapsed after the electric vehicle 3 departs from a next departure point. With reference to the example shown in FIG. 12, a point where a time elapsed after the electric vehicle 3 departs from a next departure point is a first value (for example, one hour) is determined as a reachable point $57_1$, and a point where the elapsed time is a second value (for example, 45 minutes) different from the first value is determined as a reachable point $57_2$. Further, the same reachable range display screen may be generated with respect to a travel distance after the electric vehicle 3 departs from a next departure point. A point where a travel distance after the electric vehicle 3 departs from a next departure point is a first value (for example, 20 kilometers) is determined as a reachable point $57_1$, and a point where a travel distance is a second value (for example, 15 kilometers) different from the first value is determined as a reachable point $57_2$.

Through the above processes, the data processing performed in the host computer 1 and the traffic flow simulator 2 for displaying the reachable range display screen on the user terminal 4 is completed.

According to the operation of the EV management system 10 according to the above-described embodiment, it is possible to provide information indicating whether the electric vehicle 3 can reach a destination to a user, and to provide a reachable range display screen for displaying ranges capable of being reached by the electric vehicle 3 to the user when the electric vehicle 3 departs from a destination using the destination as a next departure point after the electric vehicle 3 reaches the destination. A reachable point for which it is determined that the electric vehicle 3 can reach the point through a simulation based on an actual travel path and an actual travel state is displayed on the reachable range display screen, which is more useful for determining actions capable of being executed after reaching a destination.

It should be noted that since plural reachable points are obtained through a traveling simulation, linear distances from a destination (a next departure point) may not be identical. That is, two reachable points among the plural reachable points may have different linear distances from the destination. In such a case, a closed curve that forms the boundary line 58 is not displayed as a circle. In a method of simply calculating a reachable distance in a case where an electric vehicle departs from a destination based on the SOC after the electric vehicle reaches the destination (without a simulation), it is not possible to specifically calculate a reachable point, and for example, it is possible to display ranges capable of being reached by an electric vehicle when the electric vehicle departs from a destination after the electric vehicle reaches the destination only as a circle. In this way, in this embodiment, in consideration of an actual travel path and an actual travel state, a reachable range display screen indicating a more specific reachable range is obtained. This contributes to providing more useful information for determination of actions capable of being taken after reaching a destination to a user.

Figure 13:
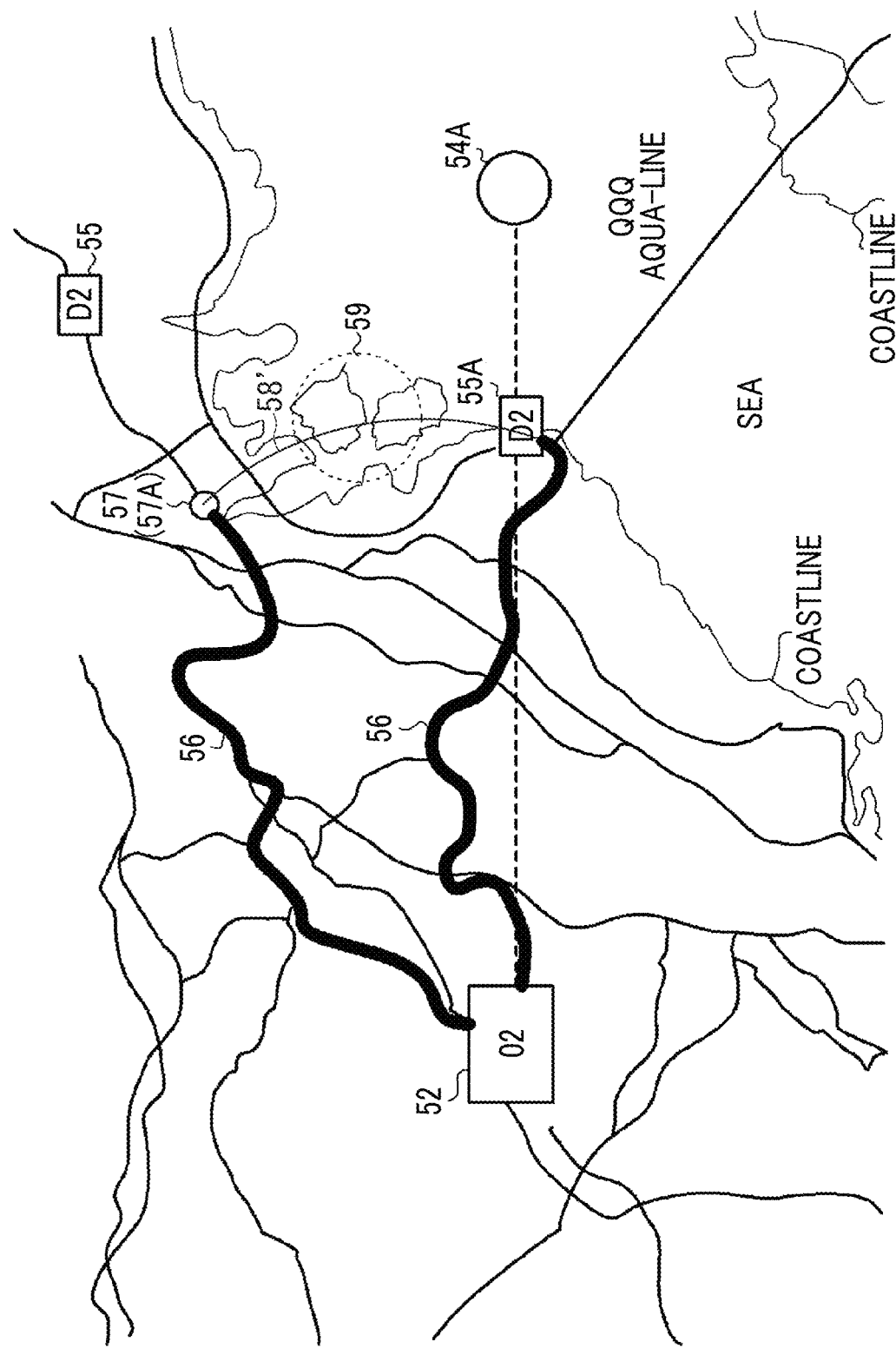
FIG. 13 is a conceptual diagram illustrating a problem of underestimation of a reachable range which may occur in a case where a next destination range is set in an area (for example, the sea) where a road is not present in the embodiment.

In calculation of the reachable points 57 and generation of the reachable range display screen according to the above-described procedure, in step S04, in a case where the next destination range 54 is set in an area (for example, the sea) where a road is not present, reachable range may be displayed to be narrower than original reachable ranges from a next departure point. FIG. 13 is a diagram illustrating such a problem.

For example, in FIG. 13, it is assumed that a next destination range 54A is set on the sea. In this case, since a node 29 of the road network model 27 is not present in the next destination range 54A, it is necessary to adjust a next destination range in steps S05 and S06. Further, as a result of adjustment of the next destination range, as shown in FIG. 13, the next destination range may be set at a position which is between the next destination range 54A which is first set and a next departure point (that is, a destination 52) and is in the vicinity of the coastline. In such a case, a next destination 55A corresponding to the next destination range 54A may not be sufficiently separated from the next departure point (that is, the destination 52), and a result that an electric vehicle may reach the next destination 55A from the next departure point may be obtained through a traveling simulation of step S08.

Here, if it is determined that the next destination 55A is a reachable point and a boundary line 58' is determined using the next destination 55A and an adjacent reachable point 57A, underestimation of the reachable point may occur. This is because a region capable of being originally reached from the next departure point may be included in an region 59 inside a triangle in which the adjacent reachable point 57A, the center of the next destination range 54A, and the next destination 55A are apexes.

Figure 14:
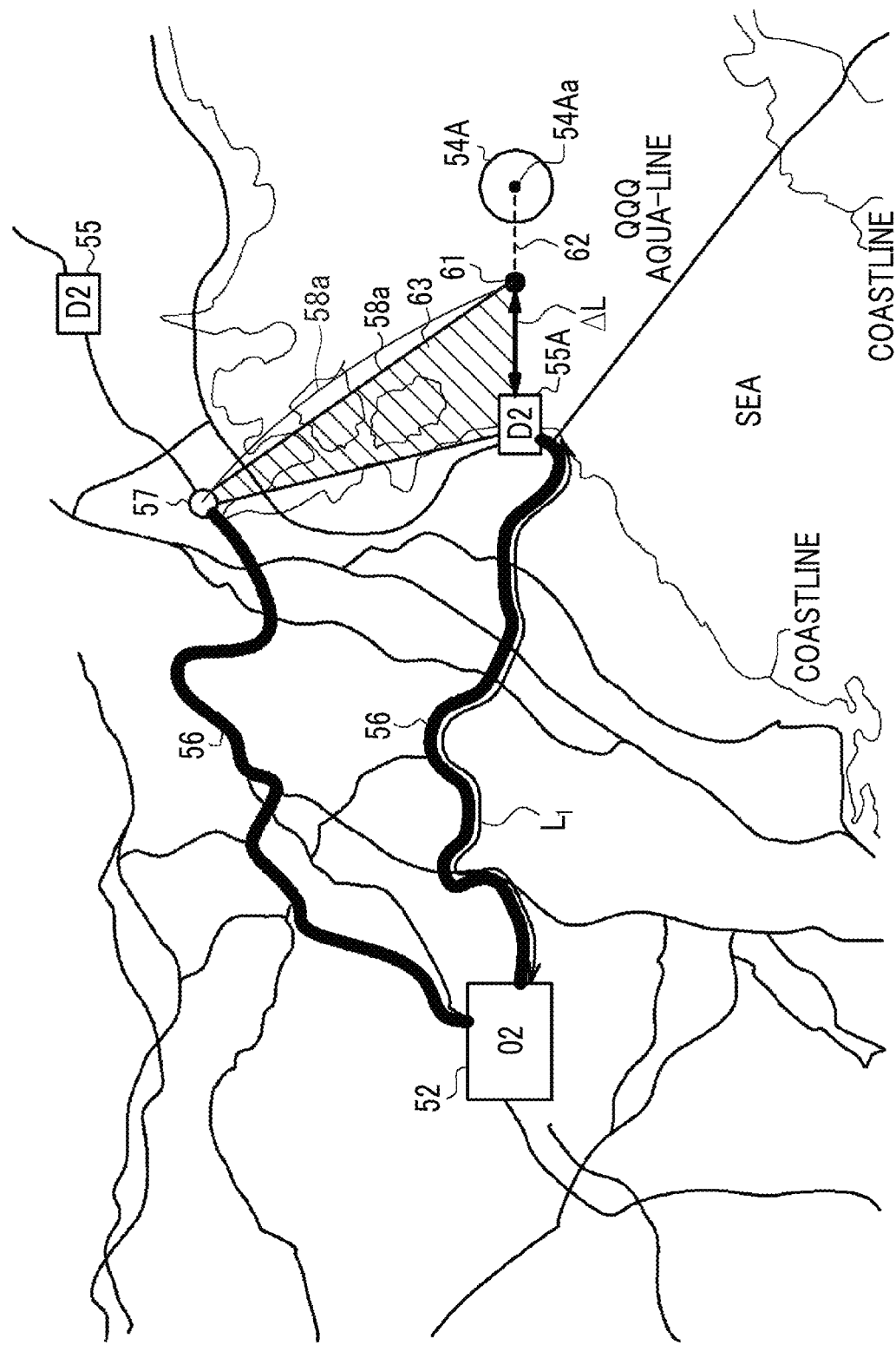
FIG. 14 is a conceptual diagram illustrating a method of solving the problem of underestimation of the reachable range in the embodiment.

FIG. 14 is a conceptual diagram illustrating a method of solving the problem of underestimation of a reachable range in the embodiment. It is assumed that a next destination range is set between a next destination range 54A which is first set and a next departure point (that is, a destination 52), a next destination 55A is selected from the next destination range, and a result that an electric vehicle can reach the next destination 55A from the next departure point is obtained through a traveling simulation of step S08. In this case, a virtual reachable position 61 is set to a position between the next destination 55A and the position of the next destination range 54A which is first set, more specifically, a position on a line segment 62 that connects the next destination 55A and the position of the next destination range 54A which is first set (for example, in a case where the next destination range 54A is a circle or a regular polygon, the position of a center 54Aa thereof). It is preferable that the virtual reachable position 61 is determined so that a distance $\Delta L$ between the virtual reachable position 61 and the next destination 55A satisfies the relationship of the following equation (1): $\Delta L = \{L_1/(SOC_{o2} - SOC_{d2})\} \times SOC_{D2}$ ... (1). Here, $L_1$ represents a traveling distance along a path 56A from the destination 52 (next departure point) to the next destination 55A, $SOC_{o2}$ represents an SOC at the destination 52 calculated in a traveling simulation of step S01, and $SOC_{d2}$ represents an SOC at the next destination 55A calculated in a traveling simulation of step S08.

In this case, the boundary line 58 may be determined as a curve (closed curve) that passes through the virtual reachable position 61 and an adjacent reachable point 57A. In FIG. 13, a case where a portion 58a between the adjacent reachable point 57A and the virtual reachable position 61 in the boundary line 58 is formed by a line segment that connects the reachable point 57A and the virtual reachable position 61 is shown. The portion 58a of the boundary line 58 may be a curve.

By determining the virtual reachable position 61 and the boundary line 58 in this way, it is possible to reduce underestimation of a reachable range. Specifically, according to the above-described method of determining the virtual reachable position 61 and the boundary line 58, a region 63 of a triangle in which the adjacent reachable point 57A, the next destination 55A, and the virtual reachable position 61 are apexes is shown as an inner area of the boundary line 58 (that is, a reachable region). The region 63 is a region considered to be really reachable, and accordingly, by causing the region 63 to be included as an inner area of the boundary line 58, it is possible to reduce underestimation of a reachable range. In a case where a result is obtained that it is possible to reach the next destination 55A through the traveling simulation of step S08, it is not necessary to calculate the virtual-reachable position 61 and determine the boundary line 58 according to such a procedure.

Hereinbefore, the embodiments of the invention have been specifically described, but the invention is not limited to the above-described embodiments. It is obvious to those skilled in the art that the invention may be modified into various forms.

For example, in the above-described embodiment, a configuration in which the host computer 1 and the traffic flow simulator 2 perform data processing using separate hardware resources is shown, but the host computer 1 and the traffic flow simulator 2 may be provided as a system that uses the same hardware resource.

Further, in the above-described embodiment, a configuration in which the reachable range display screen is generated using the host computer 1 and the traffic flow simulator 2 is shown, but an operation performed in the host computer 1 and the traffic flow simulator 2 may be performed by a different device (for example, a navigation device) as long as the different device has a sufficient operational capability. Here, as described in this embodiment, in a case where the traffic flow simulator 2 is used, by performing a simulation of a traffic flow generated as multiple vehicles (including the electric vehicle 3) travel a road, it is possible to determine whether the electric vehicle 3 can reach a destination in a situation where the traffic flow is present. In addition, in this embodiment, it is possible to generate a reachable range display screen for displaying ranges capable of being reached when the electric vehicle 3 departs from the destination using the destination as a next departure point after the electric vehicle 3 reaches the destination in a situation where the traffic flow is present. It is useful to provide more accurate information.

Further, in the above-described embodiments, an example in which an electric vehicle is used as an electric-moving-body is described, but it should be noted that the invention may be applied to an electric-moving-body such as a battery-operated motorcycle in which a battery is mounted therein and driving wheels are driven using electricity accumulated in the battery.

The invention claimed is:

1. A device for providing electric vehicle information comprising:

a calculation unit configured to, in response to an electric vehicle departing from a first destination, the electric vehicle being located at a current place position different from the first destination, set a plurality of second destination ranges surrounding the first destination, determine a plurality of nodes between the first destination and a plurality of second destinations, where each node of the plurality of nodes is associated with a corresponding second destination range of the plurality of second destination ranges, and calculate a plurality of reachable locations that the electric vehicle is able to travel to reach for each of the plurality of second destinations based on a state of charge (SOC) of a battery of the electric vehicle powering the electric vehicle at the current place position, wherein the electric vehicle reaches the first destination after the current place position, and the plurality of second destination ranges is set after the electric vehicle reaches the first destination; and a display data generation unit configured to generate display data for displaying a reachable range display screen where each of the plurality of reachable locations is visually recognizable.

2. The device for providing electric vehicle information according to claim 1,
wherein a closed curve formed by connecting each of the plurality of reachable locations with line segments or curves is displayed on the reachable range display screen.

3. The device for providing electric vehicle information according to claim 2,
wherein in a case where two reachable locations of the plurality of reachable locations have different distances with respect to the first destination, the closed curve is not a circle.

4. The device for providing electric vehicle information according to claim 3,
wherein an inner portion of the closed curve is displayed with a color tone different from that of an outer portion of the closed curve on the reachable range display screen.

5. The device for providing electric vehicle information according to claim 2,
wherein the calculation unit is configured to set the first destination as a next departure point, to determine the plurality of second destinations, to perform a traveling simulation for simulating traveling of the electric vehicle from the next departure point to each of the plurality of second destinations using a road network model that represents a road network using nodes indicating intersections and links indicating roads that connect the nodes, and to calculate the plurality of reachable locations as locations capable of being reached in a case where the electric vehicle departs from the next departure point on a path for reaching each of the plurality of second destinations from the next departure point,
in determination of the plurality of second destinations, the calculation unit is configured to set the plurality of second destination ranges surrounding the first destination, to determine, with respect to a second destination range of the plurality of second destination ranges where at least one node of the road network model is associated with a second destination range of the plurality of second destination ranges, the at least one node as the second destination, to identify the second destination range in a region including the at least one node of the road network model, to determine a changed second destination range, and the calculation unit is configured to determine a virtual reachable position disposed between the second destination and a position of the second destination range in response to a determination, through the traveling simulation, that the electric vehicle is able to reach a second destination of the plurality of second destinations determined from the changed second destination range from the next departure point based on the SOC of the battery of the electric vehicle powering the electric vehicle, and
the calculation unit is configured to determine the closed curve so that the closed curve passes through a displayed location for each of the plurality of reachable locations and the virtual reachable position.

6. The device for providing electric vehicle information according to claim 1,
wherein paths from the first destination to each of the plurality of reachable locations are displayed on the reachable range display screen.

7. The device for providing electric vehicle information according to claim 6,
wherein a path from the current place position to the first destination is displayed on the reachable range display screen.

8. The device for providing electric vehicle information according to claim 1,
wherein the calculation unit is configured to determine each of the plurality of second destinations, to set the first destination as a next departure point, to perform a traveling simulation for simulating traveling of the electric vehicle from the next departure point to each of the plurality of second destinations, and to calculate each of the plurality of reachable locations as a geographic location capable of being reached in in response to the electric vehicle departing from the next departure point on a path for reaching each of the plurality of second destinations from the next departure point.

9. The device for providing electric vehicle information according to claim 8,
wherein the calculation unit is configured to calculate an SOC of the battery of the electric vehicle powering the electric vehicle at the first destination, and determines the plurality of second destinations so that distances between the first destination and the plurality of second destinations depend on the SOC of the battery of the electric vehicle powering of the electric vehicle at the first destination.

10. The device for providing electric vehicle information according to claim 8,
wherein the calculation unit is configured to perform the traveling simulation using a road network model that represents a road network using nodes indicating intersections and links indicating roads that connect the nodes, and
the calculation unit is configured to determine the plurality of second destination ranges surrounding the first destination, and to determine a node of the nodes associated with each of the plurality of second destination ranges as the corresponding second destination.

11. The device for providing electric vehicle information according to claim 10,
wherein the calculation unit calculates an SOC of the battery of the electric vehicle powering the electric vehicle at the first destination, and determines the plurality of second destination ranges so that a distance between the first destination and each of the plurality of second destination ranges depends on the SOC of the battery of the electric vehicle powering the electric vehicle at the first destination.

12. The device for providing electric vehicle information according to claim 10,
wherein in response to the node of the nodes of the road network model begin beyond the corresponding second destination range among the plurality of second destination ranges, the calculation unit is configured to adjust the size or the position of the corresponding second destination range.

13. The device for providing electric vehicle information according to claim 1,
wherein each of the plurality of reachable locations is calculated as a location where the SOC of the battery of the electric vehicle powering the electric vehicle becomes a first value.

14. The device for providing electric vehicle information according to claim 1, wherein the calculation unit is configured to determine the plurality of second destinations surrounding the first destination, to set the first destination as a next departure point, to perform a traveling simulation for simulating traveling of the electric vehicle from the next departure point to each of the plurality of second destinations, and to calculate a plurality of condition reachable locations among the plurality of reachable locations, which are locations capable of being reached in response to the electric vehicle departing from the next departure point on a path for reaching each of the plurality of second destinations from the next departure point and satisfying a plurality of conditions, respectively, and wherein a first closed curve passes through a plurality of first condition reachable locations among the plurality of condition reachable locations that satisfy a first condition of the plurality of conditions, and a second closed curve passes through a plurality of second condition reachable locations among different conditions among the plurality of condition reachable locations that satisfy a second condition of the plurality of conditions are displayed on the reachable range display screen.

15. A method for providing electric vehicle information for providing information relating to an electric vehicle, comprising:

a step of setting, in response to the electric vehicle departing from a first destination, the electric vehicle being at a current place position different from the first destination, a plurality of second destination ranges surrounding the first destination, determining a plurality of nodes between the first destination and a plurality of second destinations, each node of the plurality of nodes is within a range of the plurality of second destination ranges, and calculating a plurality of reachable locations that the electric vehicle is able to travel to reach each of the plurality of second destinations based on a state of charge (SOC) of a battery of the electric vehicle powering the electric vehicle at the current place position, wherein the electric vehicle reaches the first destination after the current place position, and the plurality of second destination ranges is set after the electric vehicle reaches the first destination; and a step of generating display data for displaying a reachable range display screen where each of the plurality of reachable locations is visually recognizable.

16. The method for providing electric vehicle information according to claim 15, wherein the step of setting the plurality of reachable locations includes a step of determining the plurality of second destinations surrounding the first destination, a step of setting the first destination as a next departure point, and a step of performing a traveling simulation for simulating traveling of the electric vehicle from the next departure point to each of the plurality of second destinations, and wherein the plurality of reachable locations is calculated as locations capable of being reached in response to the electric vehicle departing from the next departure point on a path for reaching each of the plurality of second destinations from the next departure point, through the traveling simulation.

17. A non-transitory recording medium on which a program for realizing the method for providing electric vehicle information according to claim 15 is recorded.

* * * * *